US008601123B2

(12) United States Patent
Maeshima et al.

(10) Patent No.: US 8,601,123 B2
(45) Date of Patent: Dec. 3, 2013

(54) MEDIA MANAGEMENT METHOD FOR A MEDIA PROCESSING DEVICE

(75) Inventors: Hidetoshi Maeshima, Shiojiri (JP); Tsuyoshi Sato, Shiojiri (JP); Kazuhiro Takasu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1861 days.

(21) Appl. No.: 11/654,455

(22) Filed: Jan. 16, 2007

(65) Prior Publication Data

US 2007/0203946 A1 Aug. 30, 2007

(30) Foreign Application Priority Data

Jan. 16, 2006 (JP) .................................. 2006-007147

(51) Int. Cl.
*G06F 15/173* (2006.01)
(52) U.S. Cl.
USPC ........... 709/225; 709/203; 709/223; 709/224; 707/999.1; 707/999.01
(58) Field of Classification Search
USPC ................................................. 709/223–226
See application file for complete search history.

(56) References Cited

U.S. PATENT DOCUMENTS

| 5,991,753 A * | 11/1999 | Wilde .................................. 1/1 |
| 6,400,659 B1 | 6/2002 | Kitaoka |
| 2004/0117576 A1 * | 6/2004 | Kobayashi et al. ........... 711/163 |
| 2005/0091311 A1 * | 4/2005 | Lund et al. .................... 709/203 |

FOREIGN PATENT DOCUMENTS

| JP | 10-269679 | 10/1998 |
| JP | 2000-260172 | 9/2000 |
| JP | 2005-259318 | 9/2005 |

* cited by examiner

*Primary Examiner* — Ian N Moore
*Assistant Examiner* — Jackie Zuniga

(57) ABSTRACT

This invention is directed to a method and system of managing the processing and removal of media such as CD's and DVD's through a media processing device having a management database and a storage unit for storing processed media. The media processing system comprises an administrator PC, a plurality of user PCs, and a disc publisher interconnected through a LAN. The media processing device has a server function which writes to recordable media for forming processed media using media production data generated from media production commands from the user PCs. A user or system administrator can remove processed media from the media storage unit by entering user or system administrator authentication data into the system. If the system administrator removes all processed media from the media storage unit an e-mail message is sent to each user linked through the management database to the media processed by such user.

19 Claims, 13 Drawing Sheets

| PROCESSED MEDIA NUMBER | CREATOR | CREATION DATE AND TIME | CREATOR REMOVAL FLAG | CREATOR MEDIA REMOVAL DATE AND TIME | ADMINISTRATOR REMOVAL FLAG | ADMINISTRATOR MEDIA REMOVAL DATE AND TIME | REMAINING MEDIA COUNT |
|---|---|---|---|---|---|---|---|
| 0001 | A | 2005.04.01 | Y | 2005.04.01 | N | | 2 |
| 0002 | B | 2005.04.01 | Y | 2005.04.02 | N | | 1 |
| 0003 | C | 2005.04.01 | Y | 2005.04.02 | N | | 0 |
| ... | ... | ... | ... | ... | ... | ... | ... |
| 0101 | A | 2005.04.15 | Y | 2005.04.15 | N | | 0 |
| 0102 | A | 2005.04.15 | Y | 2005.04.15 | N | | 0 |
| 0103 | A | 2005.04.15 | Y | 2005.04.15 | N | | 0 |
| 0104 | B | 2005.04.15 | N | | N | | 1 |
| 0105 | B | 2005.04.15 | N | | N | | 2 |
| 0106 | C | 2005.04.15 | Y | 2005.04.15 | N | | 2 |
| 0107 | C | 2005.04.15 | Y | 2005.04.15 | N | | 2 |
| 0108 | B | 2005.04.15 | N | | N | | 3 |
| 0109 | B | 2005.04.15 | N | | N | | 4 |
| 0110 | A | 2005.04.15 | N | | N | | 5 |
| ... | ... | ... | ... | ... | ... | ... | ... |
| 0150 | C | 2005.04.15 | Y | 2005.04.15 | N | | 38 |
| 0151 | A | 2005.04.15 | N | | N | | 39 |
| 0152 | B | 2005.04.15 | N | | N | | 40 |

FIG. 4A

| 61 62 | 63 | 64 | 65 | 66 | 67 | 68 | 69 |
|---|---|---|---|---|---|---|---|
| PROCESSED MEDIA NUMBER | CREATOR | CREATION DATE AND TIME | CREATOR REMOVAL FLAG | CREATOR MEDIA REMOVAL DATE AND TIME | ADMINISTRATOR REMOVAL FLAG | ADMINISTRATOR MEDIA REMOVAL DATE AND TIME | REMAINING MEDIA COUNT |
| 0001 | A | 2005.04.01 | Y | 2005.04.01 | N | | 2 |
| 0002 | B | 2005.04.01 | Y | 2005.04.02 | N | | 1 |
| 0003 | C | 2005.04.01 | Y | 2005.04.02 | N | | 0 |
| ... | ... | ... | ... | ... | ... | ... | ... |
| 0101 | A | 2005.04.15 | Y | 2005.04.15 | N | | 0 |
| 0102 | A | 2005.04.15 | Y | 2005.04.15 | N | | 0 |
| 0103 | A | 2005.04.15 | Y | 2005.04.15 | N | | 0 |
| 0104 | B | 2005.04.15 | N | | Y | 2005.04.16 | 0 |
| 0105 | B | 2005.04.15 | N | | Y | 2005.04.16 | 0 |
| 0106 | C | 2005.04.15 | Y | 2005.04.15 | N | | 0 |
| 0107 | C | 2005.04.15 | Y | 2005.04.15 | N | | 0 |
| 0108 | B | 2005.04.15 | N | | Y | 2005.04.16 | 0 |
| 0109 | B | 2005.04.15 | N | | Y | 2005.04.16 | 0 |
| 0110 | A | 2005.04.15 | N | | Y | 2005.04.16 | 0 |
| ... | ... | ... | ... | ... | ... | ... | ... |
| 0150 | C | 2005.04.15 | Y | 2005.04.15 | N | | 0 |
| 0151 | A | 2005.04.15 | N | | Y | 2005.04.16 | 0 |
| 0152 | B | 2005.04.15 | N | | Y | 2005.04.16 | 0 |

FIG. 4B

MEDIA MANAGEMENT METHOD FOR A MEDIA PROCESSING DEVICE

BACKGROUND OF THE INVENTION

1. Technical Field

The present invention relates to a media processing system having a plurality of user terminals connected to a media processing device over a communication network, such as a private LAN, so that the user terminals can control driving the media processing device to process and produce removable media such as CDs and DVDs. More particularly, the invention relates to a method of managing media that is produced according to instructions from a user terminal and is stored in the media storage unit of the media processing device.

2. Related Art

A media processing device such as a disc publisher or disc duplicator generally supplies a blank CD or other blank media stored in a blank media stacker to an internal CD (media) drive, writes predetermined content to the blank CD, prints a label on the medium using an internal label printer, and then stores the completed CD in a finished media stacker or issues (discharges) the finished medium from a media exit. Media processing devices of this type are taught, for example, in U.S. Pat. No. 5,914,918, JP-A-2000-260172, and JP-A-2005-259318.

Media processing systems have also been constructed using a corporate or other private LAN so that a single media processing device connected to the LAN can be used by a plurality of user PCs that are also connected to the LAN. Users can produce media and retrieve the produced media using this type of media processing system as described below.

The user first produces the content to be written and/or printed on the blank recording medium using the user's PC, and then sends the content data over the network to the media processing device. After receiving the content data, the media processing device produces the media, hereafter "processed or finished media" and temporarily stores the processed or finished media in the internal media stacker. The user must then go to the media processing device to retrieve the processed or finished media from the media stacker.

When this type of media processing system is used to produce media containing confidential information, the finished media must be managed so that the finished media are not made available to unauthorized third parties that do not have permission to access the confidential information. In order to retrieve the finished media from the media processing device, the user is therefore preferably authenticated so that media can only be retrieved by the user that produced the media.

If the media processing device malfunctions or requires repair, for example, the media processing system administrator must remove any finished media remaining in the media processing device. Because leaving finished media in the media processing device for any length of time is undesirable in terms of data security, the administrator preferably regularly removes any unretrieved finished media from the media stacker and stores the retrieved media in a separate location. At the end of every business day, for example, the administrator preferably removes any finished media left in the media processing device and delivers the finished media the next day to the correct user.

However, when the administrator removes and stores the finished media in a different location, the user may not know where the media that the user produced went. Whether the finished media was delivered by the administrator to the correct user also cannot be confirmed. In order to prevent leakage of confidential information, media containing confidential information must be managed so that where the media went and how the media was moved from one location to another can be verified from the time the media is finished.

SUMMARY

The media management method of a media processing device according to the invention enables appropriately managing media that is produced by a media processing device connected to a communication network and contains confidential information.

A media management method for a media processing device according to a first aspect of the invention includes steps of: storing administrator information and user information in a management database, the administrator information including administrator identification information for identifying an administrator and communication address information for the administrator, and the user information including user identification information for identifying a user and communication address information for the user; processing removable media based on a media processing command when the media processing command such as a data write command is received through a communication network from a user that is registered in the management database; temporarily storing the processed media after processing is completed in a media storage unit; storing the user that issued the media processing command and the processed media linked together in the management database; enabling removing from the media storage unit only the processed media that is linked to the user identified by the user identification information when the user identification information is entered, and when the processed media is removed, registering in the management database that the processed media was removed; changing the media storage unit to a condition enabling removing all processed media that is stored in the media storage unit when the administrator information is entered, and registering in the management database that the processed media was removed by the administrator; monitoring the storage condition of processed media that is stored in the media storage unit; and when the storage condition is detected to have reached a predetermined storage condition, sending a report that the predetermined storage condition has been reached over the communication network to the communication address of at least one user and/or the communication address of the administrator registered in the management database.

This aspect of the invention enables user authentication and administrator authentication based on entered user identification information and administrator identification information, enables the user that issued a media processing command to remove the processed media from the media storage unit, enables the administrator to remove all processed media from the media storage unit, and manages who removed the processed media in the management database.

Preferably, when the storage condition of processed media in the media storage unit reaches a predetermined storage condition, a report is sent to the user or administrator that the predetermined storage condition was reached.

This predetermined storage condition could include the storage condition (immediately) after the processed media stored in the media storage unit are removed by the administrator. When this storage condition is detected, a report that the processed media was removed by the administrator is preferably sent to the communication address of each user that is linked to the processed media that was removed. The users thus know from this report that the processed media was removed from the media processing device and is held by the administrator.

Further preferably, when the administrator removes the processed media from the media storage unit, the media processing device registers in the management database that the processed media was removed from the media storage unit by the administrator, and waits to receive (over the communication network) a report from the user that the processed media was received from the administrator, and then registers in the management database that the processed media was received by the user. It can therefore be known from the management database whether processed media was actually received by the user that output the media processing command.

Yet further preferably, the media processing device power supply can be turned off only when the administrator identification information is entered (using an input device) if processed media is stored in the media storage unit. This can prevent processed media from being removed from the media storage unit of the media processing device by a person without proper authorization when the power supply is interrupted and media management is disabled.

Yet further preferably, an error report reporting a problem with the media processing device is output over the communication network to the communication address of the administrator the next time the media processing device power turns on if the media processing device power supply is unconditionally interrupted without inputting the administrator identification information. If the power is turned off by someone without proper authorization, the processed media could be removed while the power is off, and this situation can be known by the administrator from this error report. Yet further preferably in this situation, the media processing operations of the media processing device are prohibited after this error report is output.

In another aspect of the invention the predetermined storage condition includes a storage condition in which the number of processed media stored in the media storage unit as determined from the data recorded in the management database differs from the actual number of processed media in the media storage unit. The media management method also has steps of: detecting the actual number of media stored in the media storage unit using a media sensor; and sending over the communication network to the communication address of the administrator a report that a media processing device error occurred when the storage condition in which the media storage count managed by the management database differs from the actual media storage count is detected.

A difference in the storage count can occur when the administrator leaves some processed media in the media storage unit, or when processed media are stolen while the power is off. Sending an error report enables the administrator to know of such conditions. Yet further preferably in this situation, the media processing operations of the media processing device are prohibited after this error report is output.

In another aspect of the invention the predetermined storage condition includes a storage condition in which the number of processed media stored in the media storage unit reaches a predetermined count. When this predetermined storage condition is detected, the media management method sends a report that the media storage unit is nearly full to the communication address of the administrator, and sends a report requesting removal of the processed media to the communication address of each user linked to the processed media in the media storage unit.

Interruption of operation can thus be prevented as a result of the media storage unit becoming full. Users that have forgotten to retrieve processed media can also be told to remove the processed media.

In another aspect of the invention the predetermined storage condition includes a storage condition in which the number of processed media in the media storage unit that are linked to the same user reaches a predetermined count, and a report requesting removal of the processed media is sent to the communication address of the user when this storage condition is detected. This can prevent situations in which the user forgets to retrieve processed media from the media storage unit.

In another aspect of the invention the predetermined storage condition includes a storage condition in which processed media remains in the media storage unit for a predetermined time or longer. In this case the media management method registers in the management database the storage time that each piece of processed media is stored in the media storage unit, and sends a report requesting removal of the processed media to the communication addresses of the users linked to processed media that are detected to have been in the media storage unit for a predetermined time since the storage time. This can prevent situations in which the user forgets to retrieve processed media from the media storage unit.

Another aspect of the invention is a media processing device having a media supply unit for supplying removable media such as CDs and DVDs; a media drive for writing data on the media supplied from the media supply unit; a media storage unit for temporarily storing the processed media after the data is written; a media transportation mechanism for transporting the media; a control unit for controlling driving the media drive and the media transportation mechanism; a management database for storing administrator information and user information, the administrator information including administrator identification information for identifying an administrator and communication address information for the administrator, and the user information including user identification information for identifying a user and communication address information for the user; a server unit having a management database updating function, a mail communication function, an authentication function for administrator authentication and user authentication based on the administrator identification information and user identification information, and a communication function for external communication; and an input unit for entering the administrator identification information and user identification information. The control unit causes media to be supplied from the media supply unit to the media drive, the data to be written, and the processed media to be stored in the media storage unit when a data write command is received through the server unit from a user that is registered in the management database. The server unit registers the user identification information included in the data write command in the management database with the user identification information linked to the processed media information for identifying the processed media stored in the media storage unit, instructs the control unit to enable removing the processed media linked to the input user identification information when user identification information is input (through the input device), and registers in the management database that the processed media was removed by the user, and instructs the control unit to enable removing all processed media stored in the media storage unit when the administrator identification information is input (through the input device), registers in the management database that all processed media was removed by the administrator, and sends an e-mail message reporting that the processed media was removed by the administrator to the communication address of each user linked to the removed processed media.

Preferably, the server unit registers in the management database that the processed media was removed from the media storage unit by the administrator after the administrator has removed the processed media, then waits to receive a report from the user that the processed media was received from the administrator, and then registers in the management database that the processed media was received by the user.

Further preferably, the server unit enables turning the power off only when the administrator identification information is entered (using the input device) if processed media is stored in the media storage unit.

Yet further preferably, if the media processing device power supply has been unconditionally interrupted without inputting the administrator identification information, the server unit sends an error report reporting a problem with the media processing device over the communication network to the communication address of the administrator the next time the media processing device power turns on. The server unit also preferably outputs a command prohibiting media processing operations to the control unit.

Further preferably, the media processing device also has a media sensor for detecting the number of processed media stored in the media storage unit. If the number of processed media stored in the media storage unit as determined from the data recorded in the management database differs from the actual number of processed media detected in the media storage unit by the media sensor, the server unit sends a message reporting an error to the communication address of the administrator. Further preferably, the server unit also preferably outputs a command prohibiting media processing operations to the control unit after sending the error report message.

Yet further preferably, when the number of processed media stored in the media storage unit reaches a predetermined count, the server sends a report that the media storage unit is nearly full to the communication address of the administrator, and sends a report requesting removal of the processed media to the communication address of each user linked to the processed media in the media storage unit.

Yet further preferably, the server sends a report to the communication address of the user requesting removal of the processed media when the number of processed media in the media storage unit that are linked to the same user identification information reaches a predetermined count.

Yet further preferably, the server unit registers in the management database the storage time that each piece of processed media is stored in the media storage unit, and sends a report requesting removal of the processed media to the communication address of the user that is linked to processed media that are detected to have been in the media storage unit for a predetermined time since the storage time.

Another aspect of the invention is a media processing system having an administrator terminal, at least one user terminal, and a media processing device connected to each other over a communication network where the media processing device is the media processing device described herein.

Other advantages and attainments together with a fuller understanding of the invention will become apparent and appreciated by referring to the following description and claims taken in conjunction with the accompanying drawings.

BRIEF DESCRIPTION OF THE DRAWINGS

FIG. 4A shows the data stored in the management database.

FIG. 4B shows the data stored in the management database.

DESCRIPTION OF EMBODIMENTS

A preferred embodiment of the method of management and the media processing system of the present invention is described below with reference to the accompanying figures.

Figure 1:
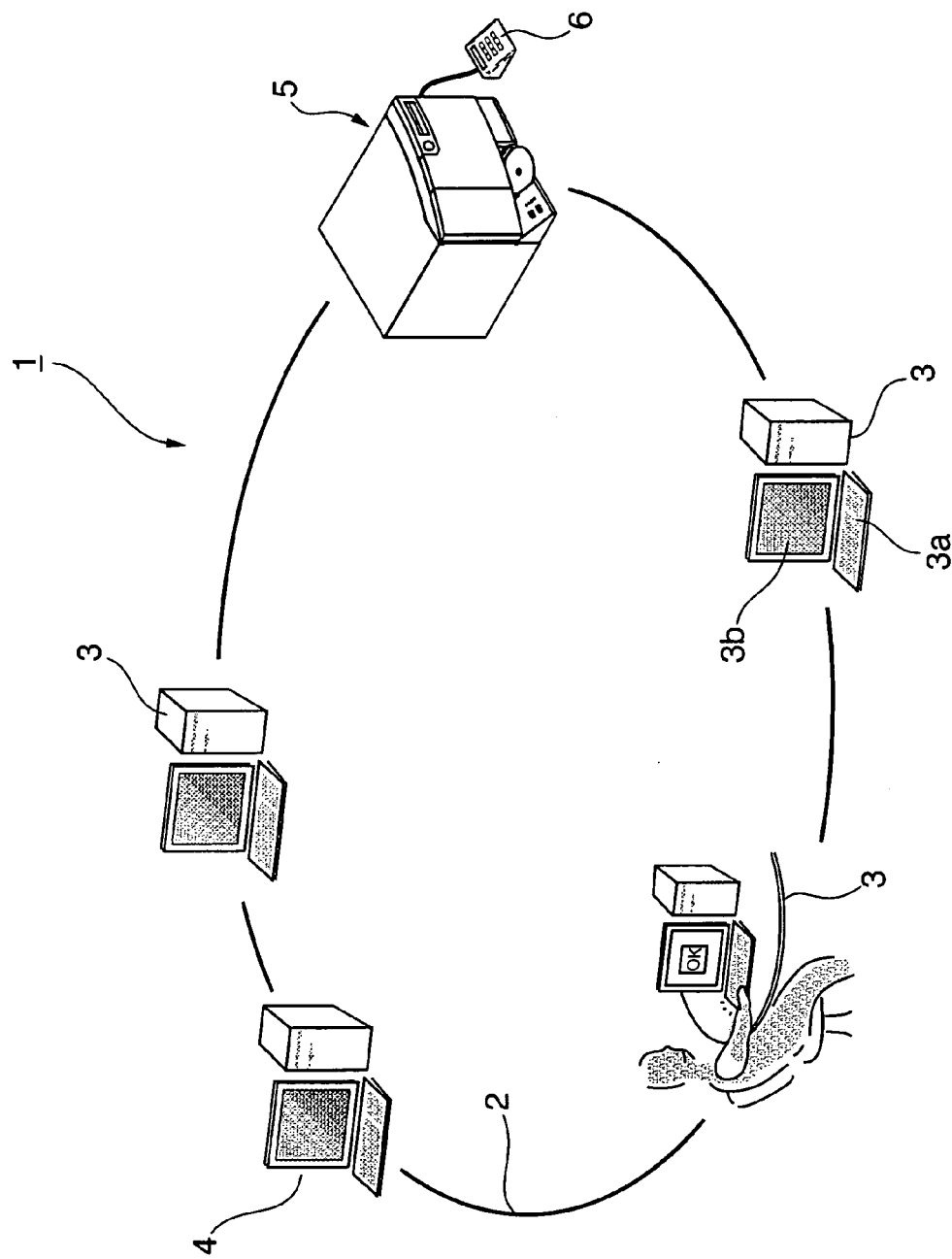
FIG. 1 is a schematic diagram of a media processing system rendered by the invention.

FIG. 1 schematically shows the general arrangement of a media processing system 1 having a media processing device such as a CD/DVD or disc publisher and a local area network (LAN) 2 interconnecting a plurality of user PCs 3 and an administrator PC 4 for managing the LAN 2. The media processing device may be a single disc publisher 5 having a server capability as further described below.

The user PCs 3 and administrator PC 4 are basically common personal computers to which an input device 3a and display device 3b are connected. Media content data that is to be recorded to blank media, label printing data, and other production data, being input to or created using a user PC 3, is supplied via the LAN 2 to the disc publisher 5. Logging in to the LAN 2 from the user PCs 3 is permitted using the user ID and password that are preassigned to each user (client). Logging into the LAN 2 from the administrator PC 4 is also based on the administrator ID and password that are preassigned to the system administrator. The LAN 2 administrator (administrator PC) and the disc publisher 5 administrator (administrator PC) can be different, and the ID and password for logging in to the LAN 2 can be different from the ID and password for logging in to the disc publisher 5.

The disc publisher 5 has an access verification function for allowing access from the user PCs 3 and administrator PC 4. The disc publisher 5 also stores a management database DB, and the finished media are managed based on the information stored in the database. An input device 6 with a keypad, for example, is also connected to the disc publisher 5. This input device 6 is used for user verification and administrator verification, and to enter requests to retrieve finished media.

Figure 2:
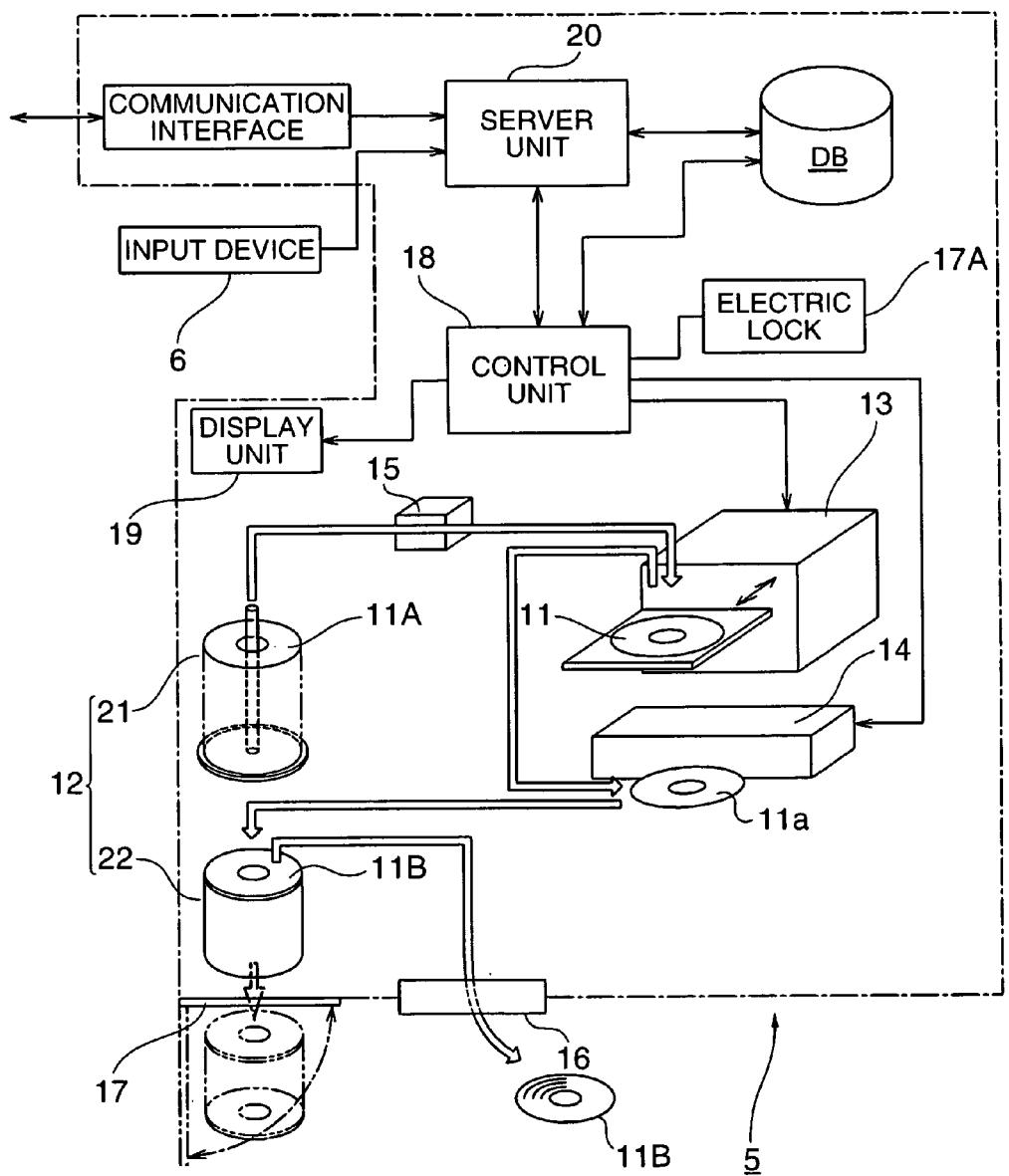
FIG. 2 is a schematic diagram of mainly the mechanical systems of the disc publisher shown in FIG. 1.
Figure 3:
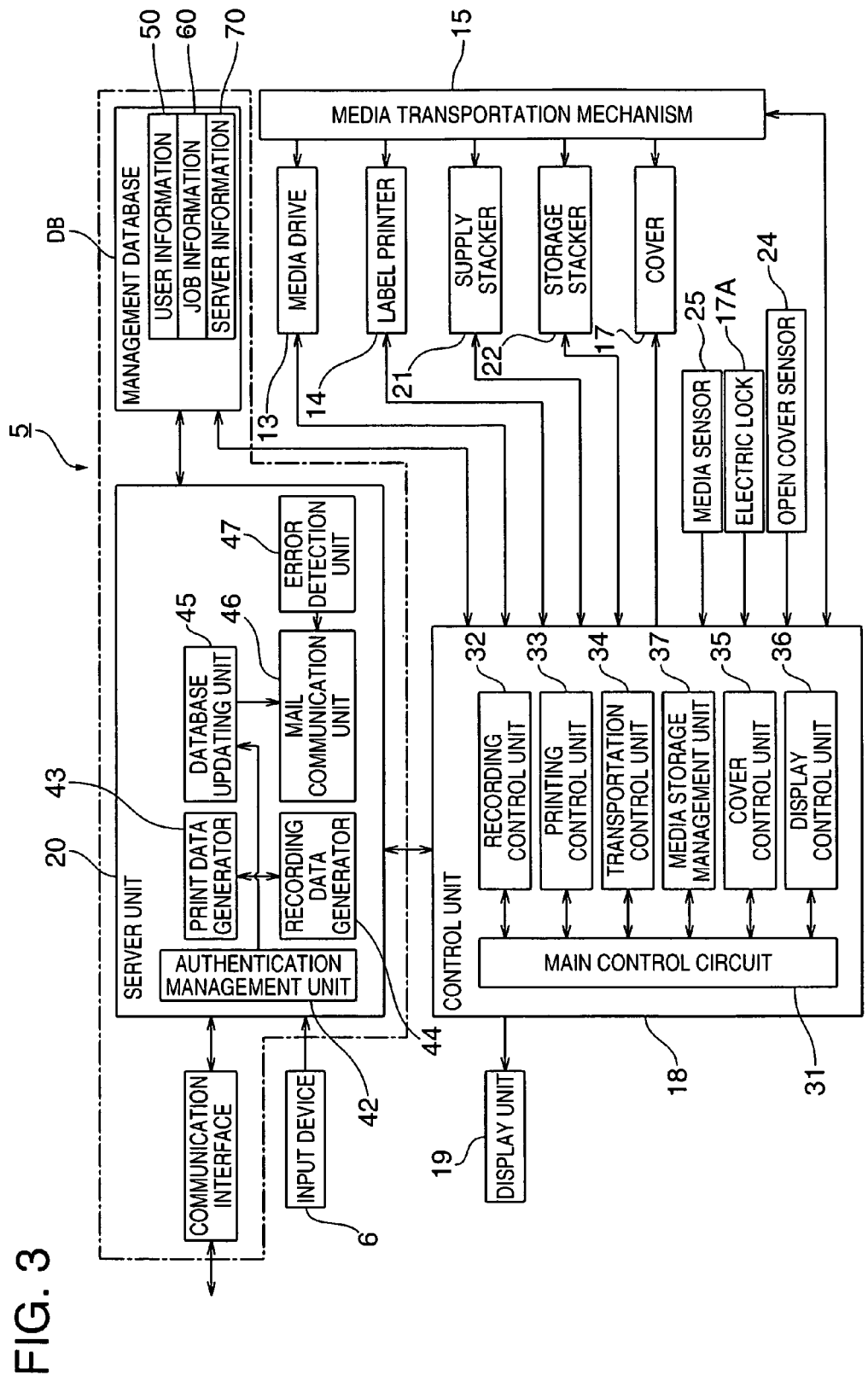
FIG. 3 is a schematic block diagram of mainly the control system of the disc publisher.

FIG. 2 is a schematic diagram showing the flow of media in the disc publisher 5. FIG. 3 is a schematic block diagram showing the control system of the disc publisher 5. As shown in FIG. 2 the disc publisher 5 has a media storage unit 12, a media drive 13, a label printer 14, a media transportation mechanism 15, a media discharge exit 16, a cover 17, a display unit 19, a server unit 20, a management database DB, and a control unit 18 that drives and controls the other parts of the disc publisher 5.

The media storage unit 12 stores the removable media 11 (blank media 11A and finished media 11B) such as CD or DVD media. The media drive 13 is used for writing data to the removable media 11 and reading data from the removable media 11. The label printer 14 prints a label such as the title of the recorded content on the label side 11a of the removable media 11 to which the content is written. The media transportation mechanism 15 transports the removable media 11. Finished media 11B are issued (discharged) from the from the media discharge exit 16. The cover 17 has an electric lock 17A and must be opened in order to remove the finished media 11B from the media storage unit 12. The server unit 20 is connected to the LAN 2 through a communication interface.

The media storage unit 12 has a supply stacker 21 for storing a supply of blank media 11A in a stack, and a storage stacker 22 (media storage unit) for similarly storing the finished media 11B in a stack. The media transportation mechanism 15 can remove the removable media 11 from the supply stacker 21 and storage stacker 22 in sequence from the top of the stack, and can store the removable media 11 to the supply stacker 21 and storage stacker 22 in sequence to the top of the stack.

The storage stacker 22 is closed to the outside by the cover 17, and the cover 17 can be opened by unlocking the electric lock 17A, which is controlled by the control unit 18. When the cover 17 is open, all finished media 11B stored in the storage stacker 22 can be removed. The electric lock 17A can be rendered using, for example, an electromagnetic solenoid that is disposed so that the electric lock 17A is locked when the solenoid is not energized and unlocks when the solenoid is energized. Whether the cover 17 is open or closed can be detected by the control unit 18 based on output from an open cover sensor 24. The open cover sensor 24 can be rendered using a photosensor or push switch, for example.

The number of finished media stored on the storage stacker 22 can be detected by a media sensor 25. The media sensor 25 is disposed to the media carrier 155 of the media transportation mechanism 15 (see FIG. 10), and includes a media detection lever that can pivot and an optical sensor for detecting the position of this media detection lever. When the media carrier 155 is lowered from directly above the storage stacker 22, the media detection lever touches the surface (the label side 11a) of the top finished media 11B stored on the storage stacker 22 and then pivots. Whether any finished media 11B are in the storage stacker 22 can thus be detected, and the height of the finished media 11B stack can be detected. The number of finished media stored in the storage stacker 22 can be determined from this stack height and the thickness of one piece of media 11. The number of blank media 11A stored in the supply stacker 21 can be similarly detected.

In addition to a main control circuit 31, the control unit 18 has a recording control unit 32 for controlling driving the media drive 13, a printing control unit 33 for controlling driving the label printer 14, a transportation control unit 34 for controlling driving the media transportation mechanism 15, a cover control unit 35 for controlling driving the electric lock 17A of the cover 17, and a display control unit 36 for controlling what is presented on the display unit 19. Each control unit 32 to 36 is directed by the main control circuit 31. The control unit 18 also has a media storage management unit 37 for managing the number of media 11 stored in the media storage unit 12 based on signals from the media sensor 25.

The server unit 20 has an authentication management unit 42, a print data generator 43, a recording data generator 44, a database updating unit 45, a mail communication unit 46, and a error detection unit 47.

When a media production command is received from a user PC 3 through the LAN 2 and communication interface, the authentication management unit 42 authenticates the user based on the user ID and password (user identification information) that are sent with the production command.

The print data generator 43 generates the print data based on the received media production data.

The recording data generator 44 generates the write data based on the received media production data.

The database updating unit 45 records media production commands received from authenticated users in the management database DB and updates the data in the database.

The mail communication unit 46 handles e-mail communication between the users and administrator.

The error detection unit 47 detects when there is a problem with the disc publisher 5.

When the server unit 20 generates the print data and recording data based on the received data, the print data and recording data are sent to the control unit 18 and the control unit 18 controls media production. More specifically, the media transportation mechanism 15 removes a blank media 11A from the supply stacker 21 and carries the blank media 11A to the media drive 13. The media drive 13 then writes the recording data to the blank media 11A. After the data is written, the media is carried by the media transportation mechanism 15 to the label printer 14, and the label printer 14 prints the print data on the media. After printing, the media transportation mechanism 15 carries the finished media 11B to the storage stacker 22 where the finished media 11B is stored.

Commands to retrieve finished media 11B can also be input to the server unit 20 from the input device 6 connected to the server unit 20. When a finished media removal command is received from the administrator using the input device 6 and the administrator is authenticated from the input administrator ID and password (administrator identification information), the server unit 20 outputs a signal permitting removal of all finished media 11B stored in the storage stacker 22 to the control unit 18. When the control unit 18 receives this signal, the control unit 18 unlocks the cover 17 by means of the cover control unit 35 so that all finished media 11B can be removed from the storage stacker 22. Alternatively, the control unit 18 drives the media transportation mechanism 15 by means of the transportation control unit 34 to remove the finished media 11B one disc at a time from the storage stacker 22 and discharge the finished media 11B from the media discharge exit 16.

When a user enters a command from the input device 6 to remove finished media 11B and the user is authenticated based on the input user ID and password, the server unit 20 outputs a signal to the control unit 18 to permit removing the finished media 11B that was produced according to a media production command asserted by the user. When the control unit 18 receives this signal, the control unit 18 drives the media transportation mechanism 15 by means of the transportation control unit 34 to remove the specific finished media 11B from the storage stacker 22 and discharge the finished media 11B from the media discharge exit 16.

The media removal command could also be sent from the user PC 3 or administrator PC 4 through the communication interface to the server unit 20.

The management database DB stores user information 50, job information 60, and server information 70.

The user information 50 includes the user ID assigned to each user, the user password, and the user's e-mail address.

The job information 60 is information about the media production jobs that are run according to media production commands from the users, and the job information 60 is stored with a key link to the user that sent the media production command.

The server information 70 stores the administrator ID assigned to the administrator, the administrator password, and the administrator's e-mail address.

FIG. 4A shows primarily the job information 60 portion of the management database DB. When a media production command is received from a user, a media processing job 61 is created for each disc processed. Each media processing job 61 includes the processed media number 62 used for media identification, the creator (user) 63, creation date and time 64, a creator removal flag 65 denoting whether the finished media was removed by the creator, the creator media removal date and time 66, an administrator removal flag 67 denoting whether the administrator removed the finished media, the administrator media removal date and time 68, and the remaining media count 69 denoting how many processed media 11 are stored in the media storage unit when the media is created.

An administrator that logs in using the administrator ID and password from the administrator PC 4 can freely access the management database DB. A user that logs in from a user PC 3 has limited access to the management database DB, such as the ability to access only data for media created by the user.

Media Production and Finished Media Removal Operations

Figure 5:
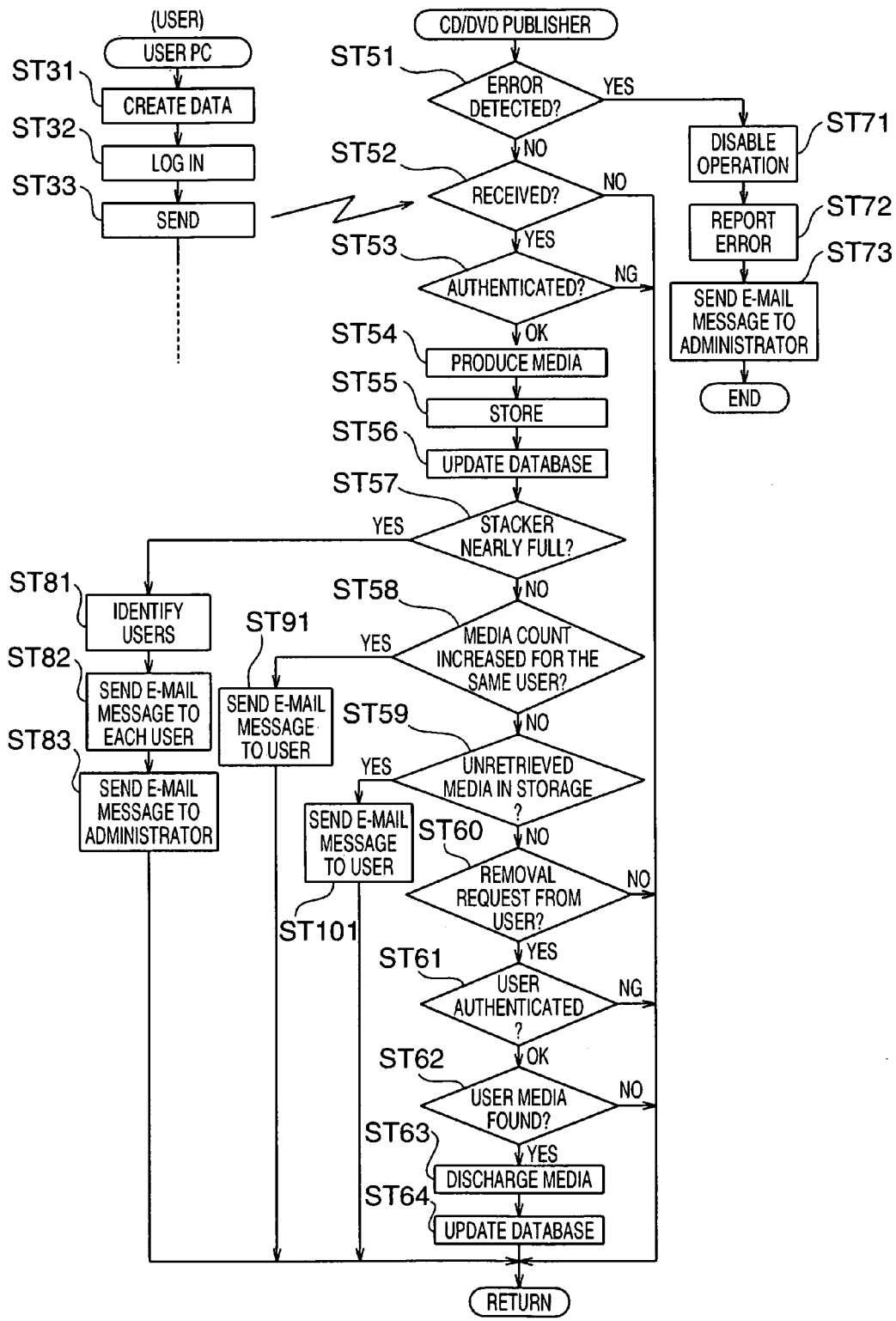
FIG. 5 is a flow chart of the media production operation and the operation whereby the user retrieves finished media.

FIG. 5 is a flow chart of an example of the media production operation and finished media removal operation of this media processing system 1.

When the disc publisher 5 power turns on the error detection unit 47 runs an error check (ST51) and switches to an operating state standby mode (ST52) only if no error is found.

As further described below, if the last shutdown operation did not execute normally, and if the number of finished media registered in the management database DB as being held in the finished media storage does not match the actual number of finished media being stored, the disc publisher 5 remains in a non-operating state (ST71), an error warning is presented on the display unit (ST72), and an error message is sent to the e-mail address of the administrator (ST73).

At some point a user A produces the media production data using a user PC 3 connected to the LAN 2 (ST31), and logs in to the LAN 2 using the user ID and password (ST32). The media production command, media production data, user ID and password are then sent to the disc publisher 5 (ST33).

When data is received from a user PC 3 (ST52), the authentication management unit 42 of the disc publisher 5 authenticates the user based on the user ID and password received from the user and the user information 50 stored in the management database DB (ST53). After user authentication, the media production data (print data and recording data) is created based on the received data and supplied from the server unit 20 to the control unit 18.

The control unit 18 then writes and prints the blank media 11A based on the media production data to produce the finished media 11B (ST54). The finished media 11B could obviously be produced by only writing the content data or by only printing a label. The finished media 11B is then stored in the storage stacker 22 (ST55). In addition, the database updating unit 45 adds a new media processing job 61 to the management database DB and records the processed media number 62, creator 63, and creation date and time 64. The number of finished media 11B left in the storage stacker 22 at the time a new disc is produced is also saved (ST56).

The operation whereby a user removes finished media 11B from the storage stacker 22 is described next.

When the user goes to the disc publisher 5 to remove the finished media 11B and enters a media removal command from the input device 6, the user also enters the user ID and password (ST60). The server unit 20 then authenticates the user from the input user ID and password (ST61) and determines whether the finished media 11B created by the user is stored in the storage stacker 22 based on the user information 50 and job information 60 in the management database DB (ST62). If finished media 11B created by the user is found, the number of the finished media 11B from the top of the storage stacker 22 is calculated from the number of remaining discs and the processed media number 62 stored in the media processing job 61, and the number of the finished media 11B is sent to the control unit 18.

The control unit 18 then controls the media transportation mechanism 15 to retrieve and discharge the desired finished media 11B from the media discharge exit 16 (ST63). More specifically, the other finished media 11B are moved one disc at a time to the supply stacker 21 until the desired finished media 11B is the top disc on the storage stacker 22, the desired finished media 11B is then discharged from the media discharge exit 16, and the finished media 11B that were moved to the supply stacker 21 are returned one by one to the storage stacker 22.

If plural finished media 11B created by the same user are stored on the storage stacker 22, all finished media 11B created by that user are discharged. Alternatively, the index numbers of all finished media 11B created by the user can be presented on the display unit 19 in step ST63 so that the user can select the desired finished media 11B from among the displayed numbers and remove only the desired disc.

After the finished media 11B is removed, the creator removal flag 65 is set to show that the user removed the media and the date and time 66 that the user removed the finished media 11B are recorded in the media processing job 61. The number of remaining discs that is recorded in each media processing job 61 is also updated (ST64). The date and time information can be acquired from a real-time clock (not shown) provided in the disc publisher 5.

When the disc publisher 5 detects that the storage stacker 22 is nearly full with finished media 11B (ST57), the mail communication unit 46 determines the users that created the finished media 11B in storage (ST81) and sends an e-mail message requesting removal of the finished media 11B from the storage stacker 22 to all of the identified users (ST82). An e-mail message indicating that the storage stacker 22 is nearly full is also sent to the administrator (ST83).

The number of finished media 11B remaining in the storage stacker 22 can be calculated as follows.

As described above each time a disc is produced the database updating unit 45 writes a new media processing job 61 to the job information table of the management database DB and saves the processed media number 62, creator 63, and creation date and time 64. The server unit 20 determines the total number of finished media 11B left in storage stacker 22 from the job information 60. More specifically, the total number of remaining discs is acquired by subtracting the number of finished media 11B that are recorded as having been removed from the total number of finished media 11B.

If the maximum capacity of the storage stacker 22 is 50 discs, for example, the e-mail messages described above are sent when the number of discs stored in the storage stacker 22 reaches 40. This helps prevent the storage stacker 22 from becoming full so that disc publisher 5 operation is interrupted. In addition, because all of the discs stacked above the desired finished media 11B must be moved in order to remove a particular finished media 11B, prompting the users to retrieve their discs also prevents a significant drop in media retrieval efficiency.

The total number of remaining discs in the storage stacker 22 is calculated each time a new disc is produced in this example, but the total number of remaining discs can be calculated at some predetermined sampling period.

This embodiment of the invention also sends an e-mail message to a user when the number of finished media created by the user and left in the storage stacker 22 reaches some predetermined limit. More specifically, if the number of finished media 11B in the storage stacker 22 that were created by the same user exceeds a predetermined limit (ST58), the mail communication unit 46 sends an e-mail message instructing that user to remove the finished media 11B from the storage stacker 22 (ST91).

This e-mail message may be sent when the number of finished media 11B that were created by the same user and are left in the storage stacker 22 reaches the limit of ten discs. Furthermore, because the user may have forgotten to remove the finished media 11B if the number of finished media 11B created by that user and left in the storage stacker 22 is more than ten, the user is preferably prompted to remove the discs by sending an e-mail message. The number of remaining discs can be calculated for each user at a regular interval from the creator 63 and creator and administrator removal flags 65 and 67 that are stored in the job information 60, or the number of remaining discs can be recorded in the job information 60 for each user.

This embodiment of the invention also sends an e-mail message prompting removal of any finished media 11B that has been stored in the storage stacker 22 for a long time. The server unit 20 therefore monitors the creation date and time values 64 stored in each media processing job 61 in the job information 60 at a regular interval to determine if there is any finished media 11B in the storage stacker 22 that has been stored for more than a predetermined storage time since the creation date and time 64 (ST59). If there is, the mail communication unit 46 sends an e-mail message saying that the finished media 11B should be removed from the storage stacker 22 to the users that created the finished media 11B (ST101). If this predetermined storage time is one hour, for example, and there is a finished media 11B that has been left in the storage stacker 22 for more than one hour, the user that created that media 11B is assumed to have forgotten to retrieve the disc and an e-mail message telling the user to retrieve the finished media 11B is therefore sent to the user.

The number of discs in storage and the time in storage that are used as threshold values for notifying the user are obviously not limited to the values described above and can be separately set for each user.

Removing Finished Media by the Administrator

Figure 6:
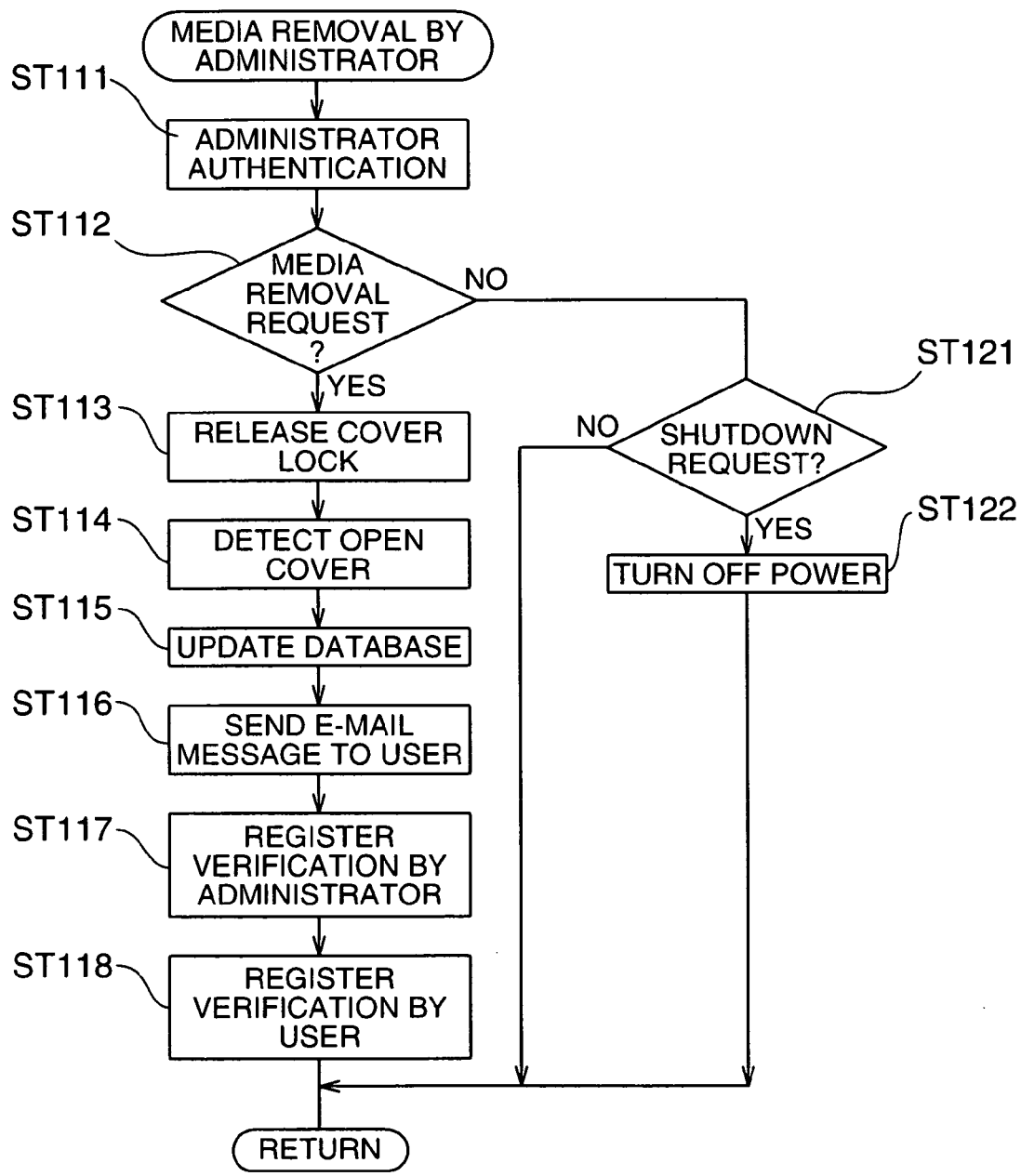
FIG. 6 is a flow chart of the operation whereby the system administrator retrieves finished media.

FIG. 6 is a flow chart of the operation whereby the administrator removes finished media 11B from the disc publisher 5. The administrator preferably removes all finished media 11B stored in the storage stacker 22 and stores the finished media 11B in a safe place during the night or other time when the disc publisher 5 is not being used.

To remove all finished media 11B, the administrator goes to the disc publisher 5 and enters the administrator ID and password from the input device 6 (ST111). The authentication management unit 42 of the disc publisher 5 then authenticates the administrator based on the server information 70. When a media removal command is entered from the input device 6 after administrator authentication (ST112), the cover control unit 35 unlocks the electric lock 17A of the cover 17 (ST113). The administrator then opens the cover 17 and removes all finished media 11B from the storage stacker 22.

Note that the disc publisher 5 may requires the administrator to enter the administrator ID and password in response to the media removal command.

The open cover sensor 24 detects when the cover 17 is open and the administrator is therefore assumed to have removed all finished media 11B from the storage stacker 22 (ST114). Alternatively, a sensor for detecting when the storage stacker 22 is removed can be provided, and the administrator can be determined to have removed all finished media 11B from the storage stacker 22 when both the cover 17 is open and the storage stacker 22 has been removed.

The database updating unit 45 then updates the management database DB (ST115). More specifically, as shown in FIG. 4B, the flag 67 indicating that the administrator removed the finished media 11B and the date and time 68 of media removal by the administrator are stored in the media processing job 61 for the removed finished media 11B. The remaining number of finished media 11B is also reset to 0 in each media processing job 61.

The mail communication unit 46 then sends an e-mail message saying that the administrator removed the finished media 11B to the e-mail address of the user (ST116). To get the finished media 11B after receiving this e-mail message, the user goes to and receives the finished media 11B from the administrator.

Fields for tracking whether finished media 11B that are removed by the administrator are later received by the user are also set in the media processing job 61 for the finished media 11B that are removed by the administrator. More specifically, there are two additional fields, one for administrator confirmation and one for user confirmation.

The administrator that passes the finished media 11B to the user accesses the management database DB from the administrator PC 4 and records that the finished media 11B was delivered to the user (ST117). The user accesses the management database DB from the user PC 3 and records that the finished media 11B was received from the administrator (ST118). Whether finished media 11B that was removed by the administrator was delivered to the user can thus be monitored by requiring both the administrator and user to register in the management database DB whether the finished media 11B is received by the user from the administrator.

Note that because the administrator removal flag 67 in the management database DB is updated in step ST115, step ST117 can be omitted and the user alone could verify receipt of the media from the administrator in step ST118.

Disc Publisher Error Detection

If the disc publisher 5 does not shut down correctly, or if the stored number of finished media registered in the management database DB differs from the actual number of finished media that are stored, operation of the disc publisher 5 remains disabled, an error is reported on the display unit 19, and an e-mail message reporting the error is sent to the e-mail address of the administrator. The media production operation of the disc publisher 5 is then disabled (steps ST71 to ST73 in FIG. 5).

Operation when the disc publisher 5 does not shut down normally is described first. If any finished media 11B remain in the storage stacker 22, the disc publisher 5 can only be shut down by the administrator and administrator authentication is required to turn the disc publisher 5 power off in this embodiment of the invention. Referring to FIG. 6, when a shutdown request is asserted (such as by operating a power supply switch not shown) (ST121) after administrator authentication (ST111), the administrator shutdown request is recorded, the power is turned off, and operation ends (ST122).

However, if the power is turned off without administrator authentication, someone other than the administrator may have turned the power off (such as by unplugging the power supply cord) and removed the finished media. As a result, if the power was turned off without administrator authentication (if there is no record that the administrator turned the power off), the error detection unit 47 sends an e-mail message reporting the abnormal shutdown to the administrator when the power turns on again as shown in steps ST71 to ST73 in FIG. 5. When the administrator receives this e-mail message, the administrator can check the storage stacker 22, compare the finished media 11B stored in the storage stacker 22 with the content of the management database DB, and thus quickly determine if any finished media 11B was stolen or other problem occurred.

In this embodiment of the invention the server unit 20 gets the total remaining number of finished media 11B left in the storage stacker 22 from the job information 60 in the management database DB when the power turns on, and detects the number of finished media 11B actually stored in the storage stacker 22 by means of the media sensor 25. If the total number of remaining discs acquired from the management database DB does not match the number of discs actually detected, the mail communication unit 46 sends an e-mail message reporting the problem to the administrator as shown in steps ST71 to ST73 in FIG. 5.

If the total number of remaining discs recorded in the management database DB differs from the actual number of discs in the storage stacker 22, the finished media 11B cannot be accurately managed based on the content stored in the management database DB. The administrator must therefore be notified to execute a recovery process. Cases in which the total remaining disc count stored in the management database DB does not match the number of discs detected by the media sensor 25 include when the administrator removes the finished media 11B from the storage stacker 22 but forgets some or all of the finished media 11B, and when finished media 11B are stolen while the power is turned off. This embodiment of the invention enables detecting when such errors occur so that appropriate measures can be quickly taken.

If finished media 11B remain in the storage stacker 22 when a shutdown request is asserted, an e-mail message prompting removal of the finished media 11B from the storage stacker 22 can be sent to the administrator or a similar message can be displayed on the display unit 19 instead of turning the power off. As a result, all finished media 11B in the storage stacker 22 will be removed and stored by the administrator before the power turns off. In this case an error will be reported and steps ST71 to ST73 in FIG. 5 will execute if finished media 11B are found to be in the storage stacker 22 when the media sensor 25 detects the presence of finished media 11B in the storage stacker 22 when the power turns on again.

Arrangement of the Disc Publisher

The physical arrangement of the disc publisher 5 is described next with reference to FIG. 7 to FIG. 12.

Figure 7:
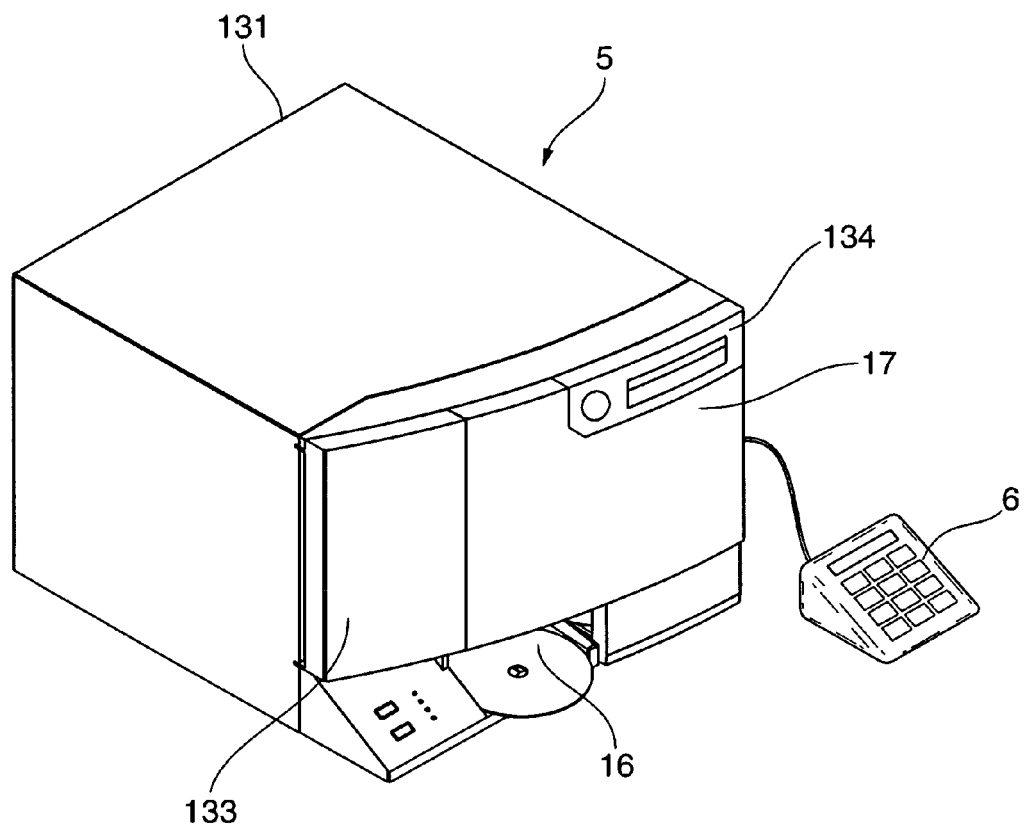
FIG. 7 is an external view of the disc publisher.

FIG. 7 is an oblique view showing the outside of the disc publisher 5. The disc publisher 5 has a substantially rectangular box-like case 131, and covers 17 and 133 that open to the right and left disposed to the front of the case 131. An operating panel 134 having an indicator, operating button, and LCD is located at the right top end of the cover 17. The media discharge exit 16 is located at the bottom center part of the covers 17 and 133. The input device 6 is also connected to the disc publisher 5. An operating panel having the same functions as the input device 6 can also be rendered in the operating panel 134 instead of providing a separate input device 6.

Figure 8:
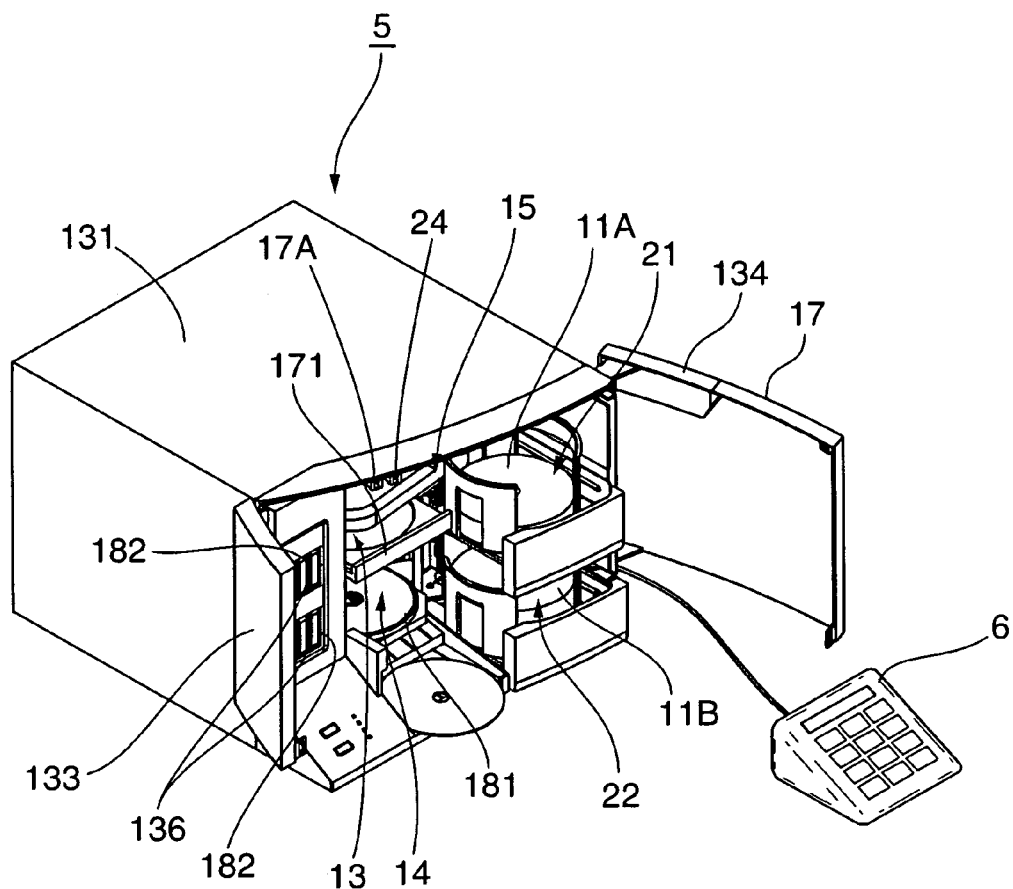
FIG. 8 is an oblique view of the disc publisher shown in FIG. 7 with the cover open.

FIG. 8 is an oblique view of the disc publisher 5 with the covers 17 and 133 open. The cover 17 is locked when closed, and can only be opened by a previously authorized administrator by entering the assigned administrator ID and password from the input device 6 or operating panel 134. The left cover 133, however, must be opened and closed in order to replace the ink cartridges in the label printer 14, and this cover 133 can therefore be opened to provide access to the ink cartridge compartment 136. There are two ink cartridge compartments 136 arranged one above the other in this embodiment.

Figure 9:
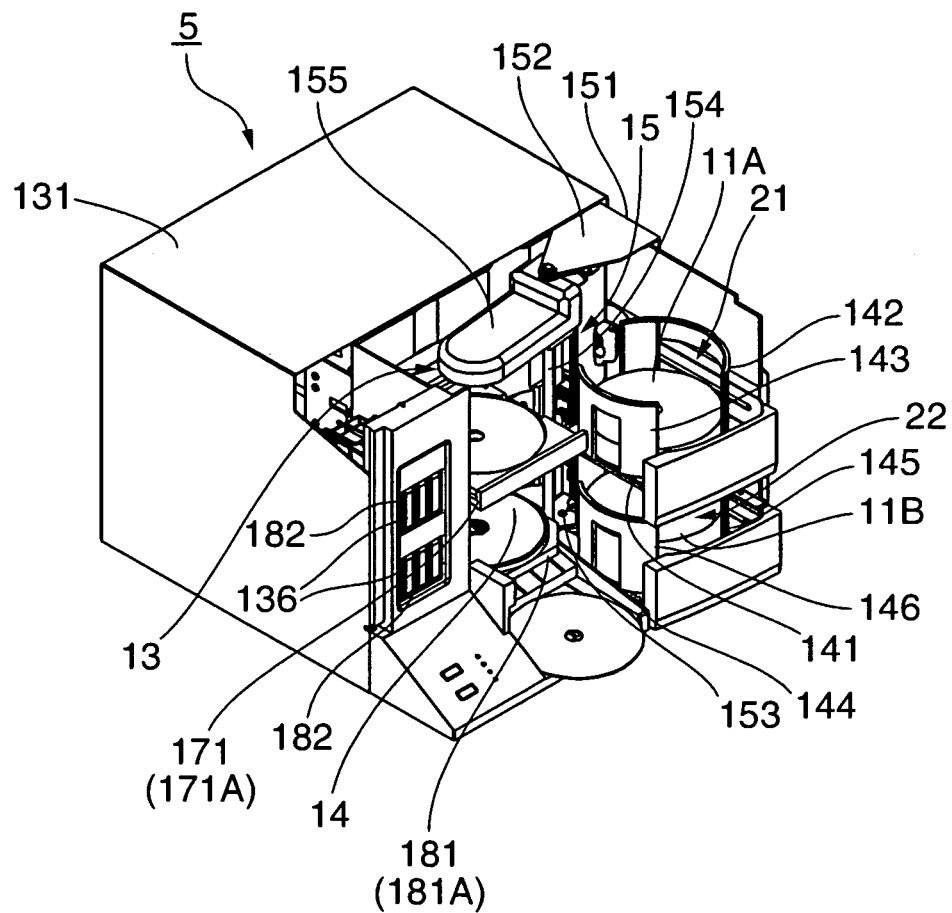
FIG. 9 is an oblique view showing the internal arrangement of the disc publisher shown in FIG. 7.

FIG. 9 is an oblique view of the disc publisher 5 with the input device 6, the covers 17 and 133, and part of the case 131 removed. As shown in FIG. 8 and FIG. 9, the supply stacker 21 and storage stacker 22 are disposed coaxially one above the other on the left side inside the case 131 of the disc publisher 5.

The supply stacker 21 has a sliding drawer 141 that can slide horizontally in and out of the case 131, and a pair of left and right curved side walls 142 and 143 disposed perpendicularly to the top of the sliding drawer 141, thus rendering a stacker to which media 11 can be inserted from the top so that the media 11 are stored in a coaxial stack. Media 11 can be loaded into the supply stacker 21 by simply opening the cover 17 and pulling the sliding drawer 141 out.

The storage stacker 22 located below the supply stacker 21 is identically arranged, having a sliding drawer 144 that can slide horizontally in and out of the case 131, and a pair of left and right curved side walls 145 and 146 disposed perpendicularly to the top of the sliding drawer 144, thus rendering a stacker to which media 11 can be inserted from the top so that the media 11 are stored in a coaxial stack.

The media transportation mechanism 15 is located behind the supply stacker 21 and storage stacker 22. The media transportation mechanism 15 includes a chassis 151 attached vertically to the case 131, a vertical guide shaft 154 disposed perpendicularly between horizontal support members 152 and 153 at the top and bottom of the chassis 151, and a media carrier 155 attached to the vertical guide shaft 154. The media carrier 155 can ascend and descend along the vertical guide shaft 154, and can pivot side to side on the vertical guide shaft 154.

The media drive 13 is located on the top at a place to the side of the supply stacker 21, storage stacker 22, and media transportation mechanism 15, and the label printer 14 is on the bottom. FIG. 8 and FIG. 9 show the media tray 171 of the media drive 13 on the top pulled forward to the media receiving position 171A, and the media tray 181 of the label printer 14 on the bottom in the forward media receiving position 181A.

The label printer 14 is an inkjet printer, uses ink cartridges 182 of specific colors as the ink supply, and these ink cartridges 182 can be loaded from the front into the ink cartridge compartment 136.

A space in which the media carrier 155 of the media transportation mechanism 15 can move vertically is rendered between the right and left side walls 142 and 143 and side walls 145 and 146 of the supply stacker 21 and storage stacker 22. A space enabling the media carrier 155 to swing horizontally and be positioned directly above the stackers 21 and 22 is also formed between the supply stacker 21 and the case 131 and between the supply stacker 21 and the storage stacker 22.

When the upper media tray 171 is pushed into the media drive 13, the media carrier 155 of the media transportation mechanism 15 can be lowered to access the media tray 181 in the media receiving position. The media 11 can therefore be transported between the different units by moving the media carrier 155 up and down and swinging the media carrier 155 right and left appropriately.

Figure 10:
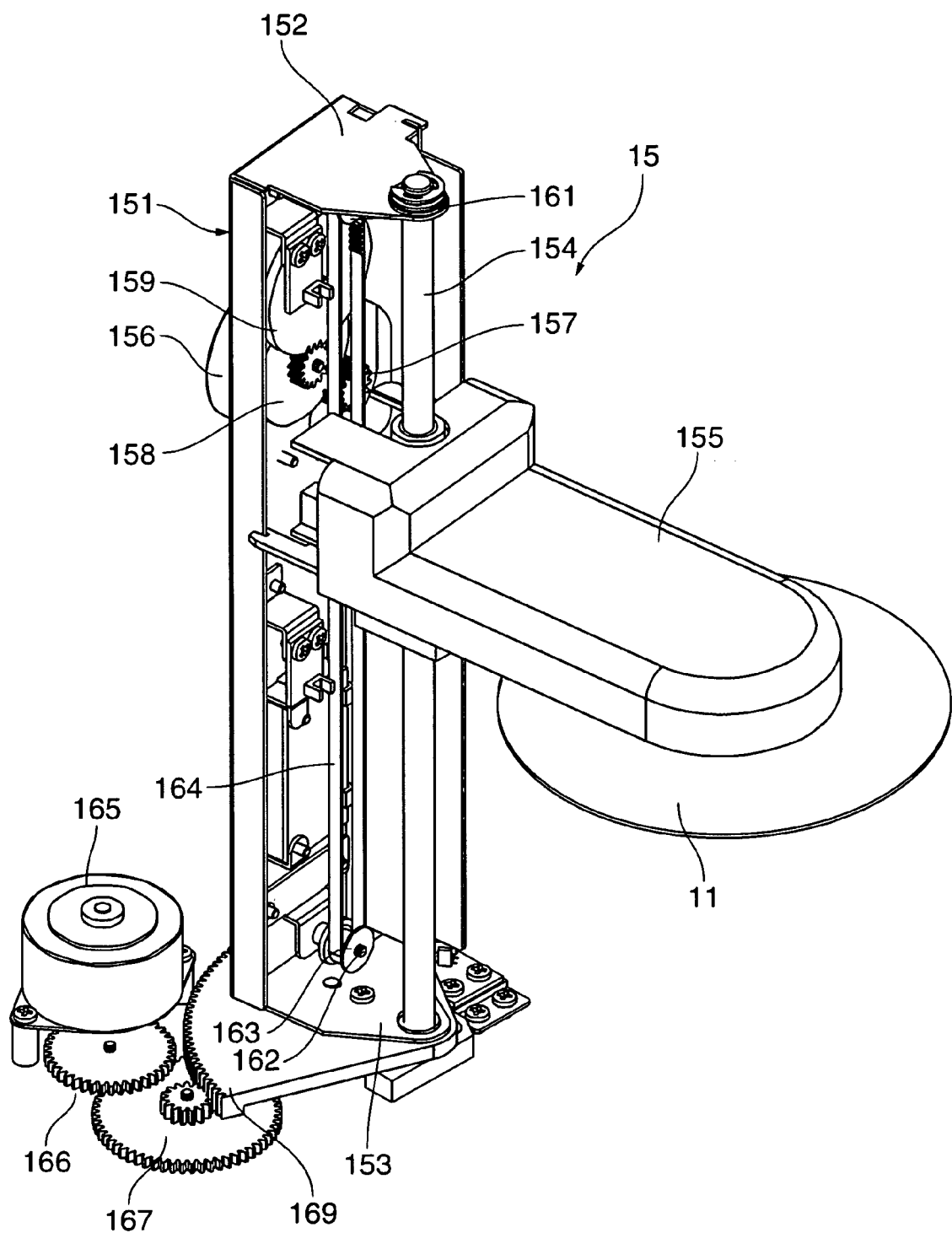
FIG. 10 is an oblique view showing the media transportation mechanism of the disc publisher shown in FIG. 7.

FIG. 10 is an oblique view of just the media transportation mechanism 15. As described above, the media transportation mechanism 15 has a chassis 151 disposed vertically to the case 131, a vertical guide shaft 154 disposed between the horizontal support members 152 and 153 at the top and bottom of the case 131, and supports the media carrier 155 so that the media carrier 155 can move vertically and can pivot on the vertical guide shaft 154.

The elevator mechanism of the media carrier 155 has a motor 156 as the drive power source, and torque from the motor 156 is passed to a drive pulley 161 through a speed-reducing gear train including a pinion 157 attached to the output shaft of the motor, a compound power transfer gear 158, and a transfer gear 159. The drive pulley 161 is supported freely rotatably on a horizontal shaft (not shown in the figure) disposed near the top end of the chassis 151. A driven pulley 163 is supported freely rotatably on a horizontal shaft 162 disposed near the bottom end of the chassis 151. A timing belt 164 is mounted between the drive pulley 161 and the driven pulley 163. The base end of the media carrier 155 is affixed to the timing belt 164 on either the left or right side. As a result, when the motor 156 turns, the timing belt 164 moves in a circle vertically between the pulleys, and the media carrier 155 affixed to the timing belt 164 moves up or down along the vertical guide shaft 154.

The media carrier 155 pivot mechanism uses a motor 165 as the drive power source, and a pinion (not shown in the figure) is attached to the output shaft of the motor 165. Rotation of the pinion is passed through a speed-reducing gear train having two compound power transfer gears 166 and 167 to a fan-shaped last gear 169. This last gear 169 can pivot right and left on the vertical guide shaft 154. The chassis 151 to which the parts of the elevator mechanism of the media carrier 155 are assembled is mounted on this last gear 169. Because the last gear 169 swings side to side when the motor 165 is driven, the chassis 151 mounted on the last gear 169 pivots in unison on the vertical guide shaft 154. As a result, the media carrier 155 that is supported by the elevator mechanism assembled to the chassis 151 also pivots horizontally on the vertical guide shaft 154.

A media pick-up mechanism is also disposed to the media carrier 155. This pick-up mechanism has three holding claws disposed in the middle at the distal end of the media carrier 155, and one of the claws can move radially to the media carrier 155. The media 11 can be held by inserting these claws into the center hole of the media 11 and then extending the one claw radially to the outside. By moving this one claw radially to the inside after picking up a disc, the media 11 can be released and allowed to drop away from the claws. An identical pick-up mechanism is also assembled to the media tray 181 of the label printer 14 described below.

Figure 11:
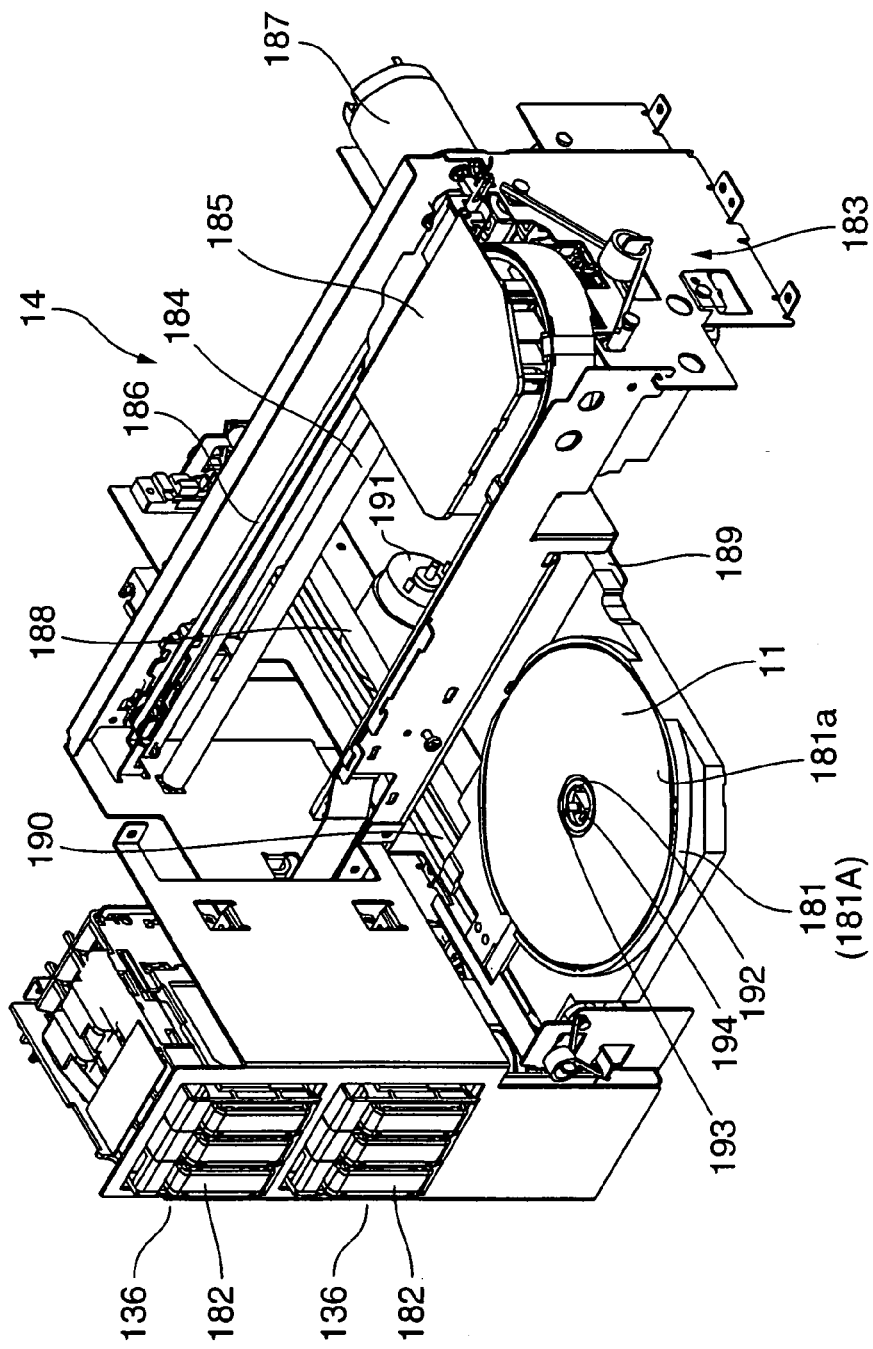
FIG. 11 is an oblique view showing the printer of the disc publisher shown in FIG. 7.
Figure 12:
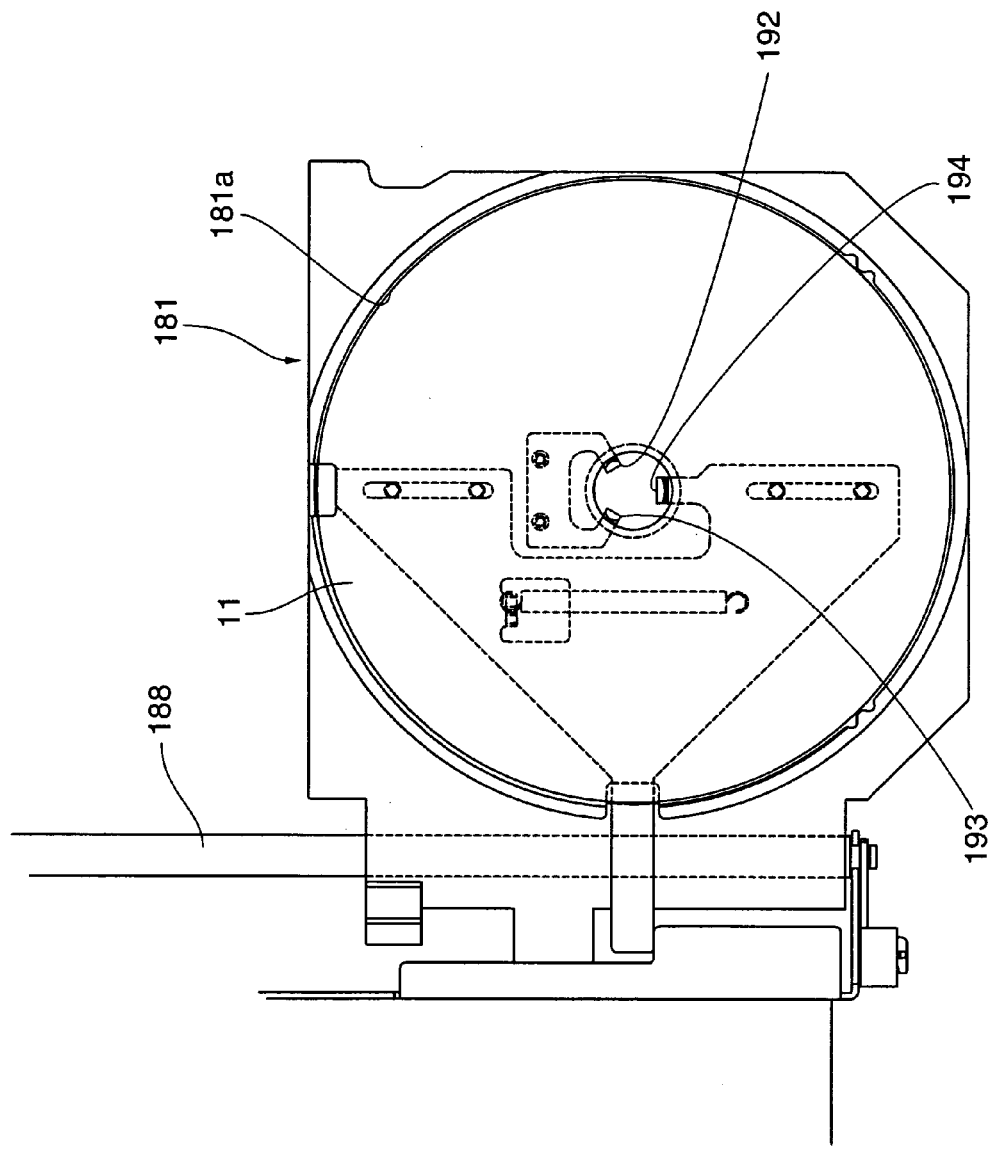
FIG. 12 is a plan view of the media tray of the printer shown in FIG. 11.

FIG. 11 is an oblique view of the label printer 14, and FIG. 12 is a plan view of the media tray 181.

The label printer 14 has a chassis 183, a carriage guide shaft 184 disposed horizontally between the left and right side panels of the chassis 183, and a head carriage 185 that carries an inkjet head (not shown in the figure) and can move bidirectionally from side to side along this carriage guide shaft 184. The carriage drive mechanism includes a timing belt 186 disposed horizontally side to side, and a carriage motor 187 to drive the timing belt 186 and carriage.

The inkjet head mounted on the head carriage 185 is disposed with the nozzle face looking down, and the media tray 181 can move bidirectionally horizontally front to back through a position below the inkjet head. The right side of the media tray 181 is supported by a guide shaft 188 that extends horizontally front to back, and the left side of the media tray 181 is supported slidably on a guide rail 189 that extends horizontally front to back. The drive mechanism of this media tray 181 includes a timing belt 190 travelling horizontally front to back, and a tray motor 191 for driving the timing belt 190 and media tray 181.

The media tray 181 has a shallow round recessed portion 181a rendered in the top of a square panel to hold the media 11. Three vertical claws 192 to 194 are disposed concentrically at a 120 degree interval in the center of the recessed portion 181a. One vertical claw 194 can move radially, and the other two vertical claws 192 and 193 are fixed in position. A solenoid or other type of drive mechanism not shown causes the one vertical claw 194 to move radially.

After a disc 11 is dropped from above with the label side 11a up into the recessed portion 181a, the three vertical claws 192 to 194 are inserted to the center hole of the media 11 and the one vertical claw 194 is then moved radially to the outside so that the three vertical claws 192 to 194 are pushed from the center of the center hole against the inside edge of the circumference of the center hole in the media 11. The media 11 is thus held on the media tray 181. The tray motor 191 can then be driven to move the media tray 181 along the guide shaft 188 to the back for positioning in the printing range of the inkjet head. The inkjet head can then be driven to print as desired on the label side 11a (printing surface) of the media 11.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media management method for managing the processing of media including a CD or DVD within a media processing device to form processed media and for the removal of such processed media from such device, the method comprising the steps of:

storing administrator information and user information in a management database, with the administrator information including administrator identification information for identifying a system administrator for the media processing device and communication address information for such system administrator, and with the user information including user identification information for identifying a user and communication address information for the user;

identifying a media processing command directed by a user registered in the management database for processing media;

storing the processed media in a media storage unit; using the management database to link the user identified with the media processing command to the media being processed by such command such that a user may only remove processed media that is linked to a given user through the user identification information;

recognizing a command from a system administrator for enabling the removal of all processed media stored in the media storage unit;

registering in the management database the removal of the processed media by the system administrator;

monitoring threshold values corresponding to a difference between the number of processed media stored in the media storage unit as determined from the data recorded in the management database and the actual number of processed media in the media storage unit, and a time period exceeding a predetermined time that processed media remains in the media storage unit;

sending a report over a communication network to the communication address of at least one user and the communication address of the administrator registered in the management database that a threshold value has been reached;

sending a report requesting removal of the processed media to the communication address of each user linked to the processed media in the media storage unit, when the number of processed media stored in the media storage unit reaches a predetermined count; and wherein an email message that the processed media was removed by the administrator is sent to the communication address of each user that is linked to the processed media that was removed.

2. The method of claim 1, further comprising steps of:

registering in the management database that the processed media was removed from the media storage unit by the administrator after the administrator has removed the processed media; and upon receipt of a report from the user registering in the management database that the user has received processed media removed from the media storage unit by the administrator.

3. The method of claim 1, wherein:

the media processing device includes a power supply which can be turned off only when the administrator identification information is entered if processed media is stored in the media storage unit.

4. The method of claim 3, further comprising a step of:

sending an error report reporting a problem with the media processing device over the communication network to the communication address of the administrator after the media processing device power turns on from being unconditionally interrupted without inputting the administrator identification information.

5. The method of claim 4, further comprising a step of:

prohibiting media processing operations by the media processing device after sending the error report.

6. The method of claim 1, wherein:

the media management method further comprising the steps of:

detecting the actual number of media stored in the media storage unit using a media sensor; and sending over the communication network to the communication address of the administrator a report that a media processing device error occurred when the storage condition in which the media storage count managed by the management database differs from the actual media storage count is detected.

7. The method of claim 1, wherein:

the threshold value is reached when the number of processed media stored in the media storage unit equals a predetermined count; and wherein the media management method further comprising the steps of:

sending a report to the communication address of the administrator that the media storage unit is nearly full, and sending a report requesting removal of the processed media to the communication address of each user linked to the processed media in the media storage unit, when the number of processed media stored in the media storage unit reaches the predetermined count.

8. The method of claim 1, wherein:

the threshold value is reached when the number of processed media in the media storage unit linked to a given user reaches a predetermined count; and wherein the media management method further comprising a step of:

sending a report requesting removal of the processed media to the communication address of the user when this storage condition is detected.

9. The method of claim 1, wherein:

the media management method further comprising the steps of:

registering in the management database the storage time that each single processed media is stored in the media storage unit; and sending a report requesting removal of the processed media to the communication address of the user linked to processed media that are detected to have been in the media storage unit for a predetermined time since the storage time.

10. A media processing device comprising:

a media supply unit for supplying media including a CD or DVD;

a media drive for writing data on the media supplied from the media supply unit to form processed media;

a media storage unit for temporarily storing the processed media; a media transportation mechanism for transporting the media;

a control unit for controlling the media drive and the media transportation mechanism;

a management database for storing administrator information and user information, the administrator information including administrator identification information for identifying an administrator and communication address information for the administrator, and the user information including user identification information for identifying a user and communication address information for the user;

a server unit having a management database updating function, a mail communication function, an authentication function for administrator authentication and user authentication based on the administrator identification information and user identification information, and a communication function for external communication; and an input unit for entering the administrator identification information and user identification information;

wherein the control unit causes media to be supplied from the media supply unit to the media drive, the data to be written, and the processed media to be stored in the media storage unit when a data write command is received through the server unit from a user that is registered in the management database;

the server unit registers the user identification information included in the data write command in the management database with the user identification information linked to the processed media information for identifying the processed media stored in the media storage unit, instructs the control unit to enable the removal of the processed media linked to the input user identification information when user identification information is input through the input unit, and registers in the management database that the processed media was removed by the user, and instructs the control unit to enable the removal of all processed media stored in the media storage unit when the administrator identification information is input through the input unit, registers in the management database that all processed media was removed by the administrator, monitors threshold values corresponding to a difference between the number of processed media stored in the media storage unit as determined from the data recorded in the management database and the actual number of processed media in the media storage unit, and a time period exceeding a predetermined time that processed media remains in the media storage unit, sends a report over a communication network to the communication address of at least one user and the communication address of the administrator registered in the management database that a threshold value has been reached; sends a report requesting removal of the processed media to the communication address of each user linked to the processed media in the media storage unit, when the number of processed media stored in the media storage unit reaches a predetermined count; and sends an e-mail message reporting that the processed media was removed by the administrator to the communication address of each user linked to the removed processed media.

11. The media processing device of claim 10, wherein:
the server unit registers in the management database that the processed media was removed from the media storage unit by the administrator after the administrator has removed the processed media and registers in the management database that the processed media was received by the user upon receipt of a report from the user that the processed media was received by the user from the administrator.

12. The media processing device described in claim 11, wherein:
the server unit enables turning the power off only when the administrator identification information is entered if processed media is stored in the media storage unit.

13. The media processing device of claim 12, wherein:
the server unit sends an error report reporting a problem with the media processing device over the communication network to the communication address of the administrator the next time the media processing device power turns on after the media processing device power supply has been unconditionally interrupted without inputting the administrator identification information.

14. The media processing device of claim 13, wherein, after sending the error report message, the server unit outputs a command prohibiting media processing operations to the control unit.

15. The media processing device of claim 10, further comprising:
a media sensor for detecting the number of processed media stored in the media storage unit;
wherein the server unit sends a message reporting an error to the communication address of the administrator when the number of processed media stored in the media storage unit as determined from the data recorded in the management database differs from the actual number of processed media detected in the media storage unit by the media sensor.

16. The media processing device of claim 10, wherein:
the server sends a report that the media storage unit is nearly full to the communication address of the administrator, and sends a report requesting removal of the processed media to the communication address of each user linked to the processed media in the media storage unit, when the number of processed media stored in the media storage unit reaches a predetermined count.

17. The media processing device of claim 10, wherein:
the server sends a report to the communication address of the user requesting removal of the processed media when the number of processed media in the media storage unit that are linked to the same user identification information reaches a predetermined count.

18. The media processing device of claim 10, wherein:
the server unit registers in the management database the storage time that each piece of processed media is stored in the media storage unit, and sends a report requesting removal of the processed media to the communication address of the users linked to processed media that are detected to have been in the media storage unit for a predetermined time since the storage time.

19. A media processing system comprising:
an administrator terminal, at least one user terminal, and a media processing device connected to each other over a communication network wherein the media processing device comprises a media supply unit for supplying media including a CD or DVD;
a media drive for writing data on the media supplied from the media supply unit to form processed media;
a media storage unit for temporarily storing the processed media; a media transportation mechanism for transporting the media;
a control unit for controlling the media drive and the media transportation mechanism;
a management database for storing administrator information and user information,
the administrator information including administrator identification information for identifying an administrator and communication address information for the administrator, and
the user information including user identification information for identifying a user and communication address information for the user;
a server unit having a management database updating function, a mail communication function, an authentication function for administrator authentication and user authentication based on the administrator identification information and user identification information, and a communication function for external communication; and
an input unit for entering the administrator identification information and user identification information;
wherein the control unit causes media to be supplied from the media supply unit to the media drive, the data to be written, and the processed media to be stored in the media storage unit when a data write command is received through the server unit from a user that is registered in the management database;
the server unit registers the user identification information included in the data write command in the management database with the user identification information linked to the processed media information for identifying the processed media stored in the media storage unit,
instructs the control unit to enable the removal of the processed media linked to the input user identification information when user identification information is input through the input unit, and registers in the management database that the processed media was removed by the user, and instructs the control unit to enable the removal of all processed media stored in the media storage unit when the administrator identification information is input through the input unit, registers in the management database that all processed media was removed by the administrator, monitors threshold values corresponding to a difference between the number of processed media stored in the media storage unit as determined from the data recorded in the management database and the actual number of processed media in the media storage unit, and a time period exceeding a predetermined time that processed media remains in the media storage unit, sends a report over a communication network to the communication address of at least one user and the communication address of the administrator registered in the management database that a threshold value has been reached; sends a report requesting removal of the processed media to the communication address of each user linked to the processed media in the media storage unit, when the number of processed media stored in the media storage unit reaches a predetermined count; and sends an e-mail message reporting that the processed media was removed by the administrator to the communication address of each user linked to the removed processed media.

* * * * *